United States Patent Office 3,347,763
Patented Oct. 17, 1967

3,347,763
PRODUCTION OF OXYGEN-CONTAINING
ORGANIC COMPOUNDS
Robert Stevenson Coffey and Herbert George Lawley, Norton-on-Tees, England, assignors to Imperial Chemical Industries Limited, London, SW. 1, England, a corporation of Great Britain
No Drawing. Filed July 1, 1963, Ser. No. 292,145
Claims priority, application Great Britain, July 2, 1962, 25,219/62
12 Claims. (Cl. 204—158)

This invention relates to the production of oxygen-containing organic compounds, particularly olefine oxides and organic acids.

It has already been disclosed to oxidise straight-chain aliphatic cis-mono-olefine compounds containing more than four carbon atoms with aliphatic per-acids, such as peracetic acid, in an organic acid solution of the corresponding aliphatic carboxylic acid. In this reaction, it is disclosed that the double bond of the mono-olefine compound is broken and oxygen is added thereto to form the olefine oxide without otherwise altering the molecular structure of the mono-olefine compound. The present application provides a process whereby both cis- and trans-olefinic compounds may be oxidised to olefine oxides. Furthermore, it is a feature of the process that the molecular structure of a substantial quantity of the olefinic compound may be changed during the course of the reaction.

According to the present invention, there is provided a process for the production of oxygen-containing organic compounds including olefine oxides and carboxylic acids which comprises the step of contacting a liquid mixture containing an aldehyde having two or more carbon atoms and an olefinic compound containing at least four carbon atoms, the double bond being in a non-terminal position, at a temperature in the range of 30° C. to 150° C. with a gas containing molecular oxygen.

Acetaldehyde is particularly suitable for use in the present invention, but higher straight-chain aliphatic aldehydes, for example propionaldehyde or n-butyraldehyde, may be employed although these are less suitable because they give rise to lower yields of desired products. Branched chain aliphatic aldehydes, for example iso-butyraldehyde, may be used but are less suitable than straight-chain aldehydes because they are more susceptible to side reactions. Although the use of lower aldehydes is preferable, it will be understood that the process may be carried out, although in an inferior manner, using higher aldehydes, and this mode of operation may sometimes be adopted, for example when a higher aldehyde is particularly readily accessible. The aldehyde to be used should also be selected to make the separation of products as easy as possible. Aromatic aldehydes, such as benzaldehyde, are also suitable for use in the present process. Benzaldehyde has the advantage over aliphatic aldehydes having a similar number of carbon atoms that it is less liable to oxidative degradation.

A wide range of aliphatic mono-olefinic compounds containing a non-terminal double bond may be used. It is also possible for the olefinic compound to contain more than one double bond. Thus, suitable starting materials are aliphatic mono-olefinic hydrocarbons containing from four to twenty carbon atoms, such as cis- and trans-butene-2 and 2:4:4-trimethyl-pentene-2; n-octene-2; cyclic mono-olefines such as cyclohexene; arylalkenes; open-chain and cyclic dienes and polyenes; and acids, alcohols, ketones and esters containing a carbon-carbon double bond, which is in a nonterminal position.

As already indicated, there is a tendency in the present process for the molecular structure of the olefinic compound employed to be changed. For example, if the starting material employed is substantially pure cis-butene-2 or trans-butene-2, the product obtained in both cases contains substantial amounts of both cis- and trans-2:3-epoxy butanes. This indicates that a change of molecular structure has taken place during the co-oxidation.

The present process may be carried out using a diluent which is relatively inert to oxidation under the reaction conditions employed. A diluent is particularly desirable when a lower aldehyde i.e. acetaldehyde and possibly propionaldehyde is employed. Diluents may however, also be used when higher aldehydes are employed. Particularly suitable diluents are acetone, methyl acetate, ethyl acetate and acetic acid. It is possible to use other organic compounds, notably higher ketones, esters and carboxylic acids, but in general compounds containing methyl groups rather than $CH_2$ or CH groups are preferable because these are less susceptible to oxidation. An exception to this is that it is sometimes preferable to use as diluent the same carboxylic acid as that being produced in the process, even though this may contain $CH_2$ or CH groups. This is because the problem of separating the diluent from the acid produced does not then arise, and this advantage may outweigh partial degradation of the acid.

The process of the present invention is preferably carried out at a temperature of 60 to 90° C. The reaction may be carried out at atmospheric pressure or at any suitable elevated pressure, the pressure being high enough to maintain the reaction mixture in the liquid phase and also to maintain a sufficiently high concentration of dissolved oxygen for the reaction to proceed at a convenient speed. In general, pressures in the range of atmospheric to 50 atmospheres gauge are likely to be of the greatest importance. The gas containing molecular oxygen may be oxygen itself, air or a mixture of oxygen with an inert diluent such as nitrogen or carbon dioxide. As far as possible, the composition of gas mixtures used or produced in the present process should lie outside the explosive limits.

The process of the present invention is advantageously carried out in the presence of one or more salts of metals of variable valency such as copper, manganese, nickel and cobalt. While inorganic salts of these metals may be employed, organic salts such as acetates, stearates, naphthenates, oleates, benzoates, acetonylacetates and acetoacetates are preferable, because, in general, these are soluble under the reaction conditions employed, and in consequence they are more effective.

The present process may also be favourably influenced by carrying it out in the presence of an initiator which is able to yield free radicals during the course of the reaction. Such initiators are hydrogen peroxide; alkyl hydroperoxides and dialkyl peroxides having formulae R—O—O—H and R—O—O—R respectively, where R is an alkyl group such as tertiary butyl; diacyl peroxides such as diacetyl peroxide or cyclo-hexyl sulphonyl acetyl peroxide; dialkyl peroxy dicarbonates such as di-isopropyl peroxy dicarbonate; peroxy esters such as tertiary-butyl perbenzoate; and azo compounds such as azo-bis-isobutyronitrile. Additionally, it is sometimes preferable to employ in conjunction a metal-containing compound and an organic initiator, both being selected from the range of compounds listed above.

Instead of, or in addition to, operating the present process using a metal compound or an organic initiator of the types disclosed above, it may be advantageous to operate under the influence of ultraviolet light.

In general, it is desirable to operate at as high a molar ratio of olefine to aldehyde as is consistent with a satisfactory space-time yield. The reaction may be operated in a batchwise manner. It may also be operated in a semicontinuous manner, that is the whole of the olefinic compound is fed initially and aldehyde is added continuously. The reaction may also be carried out in a truly continuous manner, that is both olefinic compound and aldehyde may be fed continuously to the reaction zone.

In carrying out the process of the present invention the materials of construction of the apparatus are important. For example, porcelain, enamel, resins, the metal sold under the registered trademark "Staybrite," tin and aluminium are suitable. It is advantageous for the reaction vessel to have as great a volume:surface area ratio as possible.

It is sometimes desirable for chelating agents, for example ethylene diamine tetra-acetic acid and 8-hydroxyquinoline, pyrophosphates and stannates to be incorporated in the reaction system in carrying out the process of the present invention.

The olefine oxides produced by the present process may be used in the production of polymers or they may be hydrogenated to alcohols which are suitable for use in the manufacture of plasticisers of detergents.

*Example 1*

A reaction vessel was charged with 2:4:4-trimethylpentene-2 (56.0 grams; 0.5 mole) and cobalt stearate (0.2 gram). This mixture was raised to a temperature of 74–76° C. and n-butyraldehyde (18.0 grams; 0.25 mole) was inected continuously over a period of 135 minutes, molecular oxygen being bubbled through at a rate of 20 litres per hour continuously by means of a cruciform stirrer. The reaction product, on titration, was found to contain 0.087 equivalent of butyric acid. The reaction product was neutralised with aqueous sodium hydroxide solution and extracted with ether. This extract was dried and fractionally distilled. It gave unchanged n-butyraldehyde (1.8 grams; 0.025 mole), unchanged 2:4:4-trimethyl-pentene-2 (23.1 grams; 0.206 mole), 2:3-epoxy-2:4:4-trimethylpentane (24.7 grams; 0.193 mole) and neutral high boiling material (5.1 grams). From these results the n-butyraldehyde conversion was calculated to be 90%. The yield of epoxide based on reacted aldehyde was 86% while the corresponding yield based on reacted olefine was 66%.

The experiment described above was repeated except that no n-butyraldehyde was employed. The crude product consisted largely of unchanged 2:4:4-trimethyl-pentene-2 together with 2.0 grams of 2:3-epoxy-2:4:4-trimethylpentane (compared with 24.7 grams obtained previously) and 1.6 gram of neutral, higher boiling material. Much less acid was obtained than before—0.002 equivalent compared with 0.087 equivalent. This experiment shows that under comparable conditions much more epoxide is formed in the presence than in the absence of an aldehyde.

*Example 2*

An aluminium-lined pressure-oxidation vessel having a volume of 3 litres was charged with cis-butene-2 (712 grams, actually containing by volume 97.7% cis-butene-2, 0.4% trans-butene-2, and 1.9% isobutene), ethyl acetate (500 grams) and cupric oleate (0.981 gram, containing 10.15% by weight of copper). The mixture was heated to, and maintained at, a temperature of 79–82° C. at a pressure of 400 lbs. per square inch gauge. Acetaldehyde (176 grams; 4.0 moles) and an oxygen-nitrogen mixture (8.1% by volume oxygen; total rate 1500 litres per hour) were injected continuously as separate streams over a period of 123 minutes.

Analysis of the reaction products indicated the presence of unchanged cis-butene-2 (640.5 grams; 11.44 moles of the 12.42 moles charged), unchanged trans-butene-2 (3.0 grams, corresponding to substantially all of this compound charged), unchanged isobutene (10.1 grams; 0.18 mole of the 0.24 mole charged), unchanged acetaldehyde (114.2 grams; 2.60 moles), cis-2:3-epoxy butane (22.0 grams; 0.31 mole), trans-2:3-epoxy butane (36.0 grams; 0.50 mole), ethyl acetate (485.0 grams), acetic acid (20.7 grams), water (8.3 grams), and carbon dioxide (19.1 grams). Unidentified liquid by-products included acids (0.035 equivalent) and esters (0.133 equivalent). The total consumption of oxygen was 1.58 mole.

*Example 3*

Example 2 was repeated using, however, trans-butene-2 (695 grams, containing by volume 99.25% trans-isomer, 0.65% cis-isomer and 0.1% n-butene). The following compounds were recovered from the reaction product: unchanged trans-butene-2 (645.6 grams; 11.53 moles of the 12.32 moles employed), unchanged cis-butene-2 (approximately 5 grams, corresponding to substantially all of that employed), cis-2:3-epoxy butane (11.8 grams; 0.16 mole), trans-2:3 epoxy butane (38.8 grams; 0.54 mole), unchanged acetaldehyde (118.3 grams), acetic acid (19.0 grams), carbon dioxide (23.8 grams) and water (5.2 grams).

Additionally a quantity of unidentified, high-boiling material was formed.

*Example 4*

Example 2 was repeated using a mixture of cis- and trans-butene-2 (710 grams, having a composition by volume 94.5% transisomer, 4.2% cis-isomer, 0.6% butene-1 and 0.7% n-butene), and cobaltous naphthenate as initiator (1.00 gram; cobalt content 10.0% by weight). From the reaction product, the following compounds were isolated; unchanged trans-butene-2 (554.0 grams, that is 9.89 moles of the 11.98 moles employed), unchanged cis-butene-2 (23.4 grams, that is 0.42 mole of the 0.53 mole employed), unchanged butene-1 (3.2 grams, that is 0.06 mole of the 0.08 mole originally present), unchanged acetaldehyde (89.1 grams), trans-2:3-epoxy butane (87.6 grams; 1.22 mole), cis-2:3-epoxy butane (29.4 grams; 0.41 mole), acetic acid (32.4 grams), water (15.0 grams) and carbon dioxide (65.3 grams). Additionally, some high-boiling unidentified liquid by-products were formed.

This example was repeated except that no acetaldehyde was introduced. Absorption of oxygen was small, and less than 2 grams of 2:3-epoxy butanes were detected in the product. The cis:trans ratio of the recovered olefine fraction was substantially the same as that for the feed. This comparative example shows that little oxidation takes place in the absence of an aldehyde and that at 80° C. in the presence of a transition metal such as cobalt, the isomerisation of trans-butene-2 to cis-butene-2 does not occur to any appreciable extent.

*Example 5*

Example 4 was repeated except that the initiator was azo-bis-isobutyronitrile (1.16 gram) instead of cobaltous naphthenate. The total weight of the butene-2 starting material was 713 grams instead of 710 grams. The analysis of the reaction product showed that this contained unchanged trans-butene-2 (594.5 grams, that is 10.62 moles of the 12.03 moles employed), unchanged cis-butene-2 (24.2 grams, that is 0.43 mole of the 0.53 mole employed) unchanged butene-1 (3.6 grams, that is 0.06 mole of the 0.08 mole employed), unchanged acetaldehyde (114.0 grams), trans-2:3-epoxy butane (46.3 grams; 0.64 mole), cis-2:3-epoxy-butane (14.7 grams; 0.20 mole), acetic acid (20.6 grams), water (8.6 grams), carbon dioxide (30.4 grams) and carbon monoxide (9.7 grams). Additionally, some unidentified high-boiling liquid by-products were formed.

The results obtained in Examples 2 to 5 are analysed in the table given below.

| Ex. No. | Total conversion of butene-2 (percent) | Conversion of cis-butene-2 (percent) | Conversion of trans-butene-2 (percent) | Acetaldehyde conversion (percent) | Total molar yield of epoxy butanes (percent) on total butene-2 consumed | Total moles epoxy butanes formed per mole acetaldehyde consumed | Ratio of trans:cis-epoxy butanes |
|---|---|---|---|---|---|---|---|
| 2 | 7.9 | 7.9 | Nil | 35 | 82 | 0.57 | 1.6 |
| 3 | 6.3 | Nil | 6.3 | 33 | 91 | 0.54 | 3.3 |
| 4 | 17.6 | 21.4 | 17.4 | 49 | 74 | 0.82 | 3.0 |
| 5 | 12.1 | 19.1 | 11.8 | 35 | 56 | 0.60 | 3.2 |

In each of Examples 2 to 5 the molar yield of acetic acid was between 24 and 27%, based on the amount of acetaldehyde consumed.

*Example 6*

A glass reaction vessel, having a volume of 500 ml. was charged with a mixture of cis- and trans-octene-2 (112.9 grams; 1.01 mole; trans:cis ratio 0.36:1; between 1 and 2% octene-1 present as impurity) and cobalt stearate (0.355 gram). The mixture was raised to 75–80° C. at atmospheric pressure, and freshly distilled benzaldehyde (53.1 grams; 0.50 mole) was injected continuously over 175 minutes. Molecular oxygen was bubbled through the mixture simultaneously, at a rate of 24 litres per hour by means of a cruciform stirrer. The titration of the crude reaction product (189.8 grams) showed that 0.249 equivalent of one or more carboxylic acids had been formed, while the determination of the epoxide oxygen content of the crude product showed that 0.336 mole of one or more epoxyoctanes had been produced. Saponification of the crude product with excess alkali followed by back-titration showed that one or more esters were by-products of the reaction (0.245 equivalent).

We claim:

1. A process for the production of olefine oxides and carboxylic acids which comprises the step of contacting a liquid mixture containing an olefinic compound having at least four carbon atoms, the double bond in said olefinic compound being in a non-terminal position, at a temperature in the range of 60° C. to 150° C. with a gas-containing molecular oxygen and continuously introducing into said liquid mixture an aldehyde having at least two carbon atoms.

2. A process as claimed in claim 1 in which the aldehyde is an aliphatic aldehyde containing from 2 to 4 carbon atoms.

3. A process as claimed in claim 1 in which the aldehyde is benzaldehyde.

4. A process as claimed in claim 1 in which the olefinic compound is selected from the group consisting of aliphatic mono-olefinic hydrocarbons containing from 4 to 20 carbon atoms, cyclic monoolefins, arylalkenes, open-chain and cyclic dienes and polyenes, and acids, alcohols, ketones and esters containing a carbon-carbon double bond, which is in a non-terminal position.

5. A process as claimed in claim 1 in which the reaction is carried out using a diluent which is selected from the group of compounds relatively inert to oxidation under the reaction conditions employed, consisting of acetone, methyl acetate, ethyl acetate and acetic acid.

6. A process as claimed in claim 1 in which the reaction is carried out at a temperature of 60 to 90° C. and at a pressure of atmospheric to 50 atmospheres gauge.

7. A process as claimed in claim 1 in which the reaction is carried out in the presence of a salt of at least one metal of variable valency selected from the group consisting of copper, manganese, nickel and cobalt.

8. A process as claimed in claim 7 in which the salt is an organic acid salt soluble under the reaction conditions employed.

9. A process as claimed in claim 1 in which the reaction is carried out in the presence of hydrogen peroxide as an initiator.

10. A process as claimed in claim 1 in which the reaction is carried out in the presence of an organic compound as initiator which is able to yield free radicals during the course of the reaction, selected from the group consisting of alkyl hydroperoxides, di-alkyl peroxides, di-acyl peroxides, dialkyl peroxy dicarbonates, peroxy esters and azo compounds.

11. A process as claimed in claim 1 in which the reaction is operated under the influence of ultra-violet light.

12. A process for the production of olefine oxides and carboxylic acids which comprises initially providing an aldehyde-free liquid reaction medium containing, as the sole essential reactive component, an olefinic compound having at least four carbon atoms, the double bond in said olefinic compound being in a non-terminal position, and then contacting said medium at a temperature in the range of 60° C. to 150° C. with molecular oxygen while at the same time continuously introducing into said liquid medium an aldehyde having at least two carbon atoms, the molar quantity of aldehyde being maintained throughout the reaction at a lower level than that of the olefinic compound.

References Cited

UNITED STATES PATENTS 2,567,930  9/1951  Findley et al. _____ 260—348.5
3,228,967  1/1966  Reid et al. _____ 260—348.5

JOHN H. MACK, *Primary Examiner.*

HOWARD S. WILLIAMS, *Examiner.*